US006513094B1

United States Patent
Magro (10) Patent No.: US 6,513,094 B1
(45) Date of Patent: Jan. 28, 2003

(54) ROM/DRAM DATA BUS SHARING WITH WRITE BUFFER AND READ PREFETCH ACTIVITY

(75) Inventor: James R. Magro, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,159

(22) Filed: Aug. 23, 1999

(51) Int. Cl.$^7$ ............................................. G06F 12/00
(52) U.S. Cl. ................... 711/103; 711/105; 711/152; 711/156; 710/107; 710/200
(58) Field of Search .................. 711/103, 102, 711/104–105, 152, 163, 156, 154; 710/108, 107, 200, 240

(56) References Cited

U.S. PATENT DOCUMENTS

| | | | |
|---|---|---|---|
| 4,442,504 A | * | 4/1984 | Dummermuth et al. ..... 710/264 |
| 4,818,932 A | | 4/1989 | Odenheimer |
| 5,001,671 A | | 3/1991 | Koo et al. |
| 5,226,010 A | | 7/1993 | Glidder et al. |
| 5,386,579 A | | 1/1995 | Bourekas et al. |
| 5,404,464 A | | 4/1995 | Bennett |
| 5,448,742 A | * | 9/1995 | Bhattacharya ............... 711/154 |
| 5,652,847 A | | 7/1997 | Padwekar |
| 5,655,142 A | | 8/1997 | Gephardt et al. |
| 5,664,140 A | | 9/1997 | Klein |
| 5,680,567 A | | 10/1997 | Dent |
| 5,682,498 A | | 10/1997 | Harness |

* cited by examiner

Primary Examiner—Matthew Kim
Assistant Examiner—Matthew D. Anderson
(74) Attorney, Agent, or Firm—Akin Gump Strauss Hauer & Feld LLP (57) ABSTRACT

Briefly, a processor-based device, such as a microcontroller, provides a data bus that is shared by both non-volatile memory and volatile memory. The processor-based device also provides specialized signals to facilitate the data bus sharing. A non-volatile memory controller of the processor-based device provides a non-volatile memory busy signal and a non-volatile memory request signal to a volatile memory controller of the processor-based device. The non-volatile memory busy signal indicates to the volatile memory controller when the non-volatile memory controller controls the data bus. The non-volatile memory request signal indicates to the volatile memory controller when the non-volatile memory controller needs to use the data bus. The volatile memory controller provides a volatile memory busy signal to the non-volatile memory controller which informs the non-volatile memory controller when the data bus is controlled by the volatile memory controller. By providing the non-volatile memory busy signal, the non-volatile memory request signal and the volatile memory busy signal, a processor-based device can effectively support a data bus shared by a non-volatile memory and a volatile memory. The volatile-memory controller can include a write buffer and a volatile-memory arbiter having a write buffer state and a processor bus master state. Transactions to volatile memory or non-volatile memory use a processor bus in addition to the shared data bus. When the volatile-memory arbiter is in the write buffer state, the write buffer can initiate a write buffer cycle using the shared data bus. When the volatile-memory arbiter is in the write buffer state and a non-volatile memory request signal is asserted, the volatile-memory arbiter transitions to the processor bus master state. In the processor bus master state, the write buffer cannot initiate a write buffer cycle. In this way, collisions between write buffer accesses to the volatile memory and accesses to the non-volatile memory are avoided.

20 Claims, 6 Drawing Sheets

ROM/DRAM DATA BUS SHARING WITH WRITE BUFFER AND READ PREFETCH ACTIVITY

BACKGROUND OF THE INVENTION

1. Field of the Invention

The present invention generally relates to a processor-based device that supports sharing of a data bus by volatile memory and non-volatile memory.

2. Description of the Related Art

Typically, processor-based systems provide multiple types of memory. One relatively fast memory type is dynamic random access memory (DRAM). A processor typically executes the majority of its programs in DRAM because of DRAM's speed. One drawback of DRAM is that it is volatile or, in other words, DRAM does not retain its contents once power to the processor-based system is switched off.

Alternatively, read-only memory (ROM) is typically slower than DRAM, but does not lose its contents when the power is switched off. ROM often stores code necessary to "boot" the processor-based system and then loads the code to DRAM for execution. To preserve DRAM space, in some processor-based systems, code is executed out of ROM.

The wide disparity of speed between the DRAM and ROM can potentially present significant timing concerns for processor-based systems. Those concerns have been addressed by placing the different types of memory on different address and data buses. Another basic reason for providing DRAM and ROM on separate buses has been to allow for simultaneous DRAM and ROM transactions.

SUMMARY OF THE INVENTION

Briefly, a processor-based device, such as a microcontroller, provides a data bus that is shared by both non-volatile memory and volatile memory. The processor-based device also provides specialized signals to facilitate the data bus sharing. A non-volatile memory controller of the processor-based device provides a non-volatile memory busy signal and a non-volatile memory request signal to a volatile memory controller of the processor-based device. The non-volatile memory busy signal indicates to the volatile memory controller when the non-volatile memory controller controls the data bus. The non-volatile memory request signal indicates to the volatile memory controller when the non-volatile memory controller needs to use the data bus. The volatile memory controller provides a volatile memory busy signal to the non-volatile memory controller which informs the non-volatile memory controller when the data bus is controlled by the volatile memory controller.

By providing the non-volatile memory busy signal, the non-volatile memory request signal and the volatile memory busy signal, a processor-based device can effectively support a data bus shared by a non-volatile memory and a volatile memory. In the disclosed embodiment, the non-volatile memory is a read-only (ROM) or flash device, the volatile memory is a synchronous dynamic random access memory (SDRAM) device and the shared data bus is the DRAM data bus.

The volatile-memory controller can include a write buffer and a volatile-memory arbiter having a write buffer state and a processor bus master state. Transactions to volatile memory or non-volatile memory use a processor bus in addition to the shared data bus. When the volatile-memory arbiter is in the write buffer state, the write buffer can initiate a write buffer cycle using the shared data bus. When the volatile-memory arbiter is in the write buffer state and a non-volatile memory request signal is asserted, the volatile-memory arbiter transitions to the processor bus master state. In the processor bus master state, the write buffer cannot initiate a write buffer cycle. In this way, collisions between write buffer accesses to the volatile memory and accesses to the non-volatile memory are avoided.

Further, the non-volatile controller provides a buffer enable signal to enable a 5V non-volatile memory device to share the data bus with a 3.3V volatile memory device that is not 5V tolerant. By providing the buffer enable signal, the non-volatile memory controller can activate an isolation buffer between the non-volatile memory controller and the non-volatile memory device. The buffer between the 5V non-volatile memory device and the non-volatile memory device is activated during access of the 5V non-volatile memory device to prevent damage to the 3.3V volatile memory device which can share the same data bus.

BRIEF DESCRIPTION OF THE DRAWINGS

A better understanding of the present invention can be obtained when the following detailed description of the invention is considered in conjunction with the following drawings, in which.

DETAILED DESCRIPTION OF THE PREFERRED EMBODIMENT

The following related patent applications are hereby incorporated by reference as if set forth in its entirety:

U.S. Patent Application, bearing Ser. No. 09/379,014, entitled SDRAM/CPU CLOCK SYNCHRONIZATION SCHEME, filed concurrently; and U.S. Pat. No. 6,415,348 entitled FLEXIBLE MICROCONTROLLER ARCHITECTURE, filed concurrently.

Figure 1:
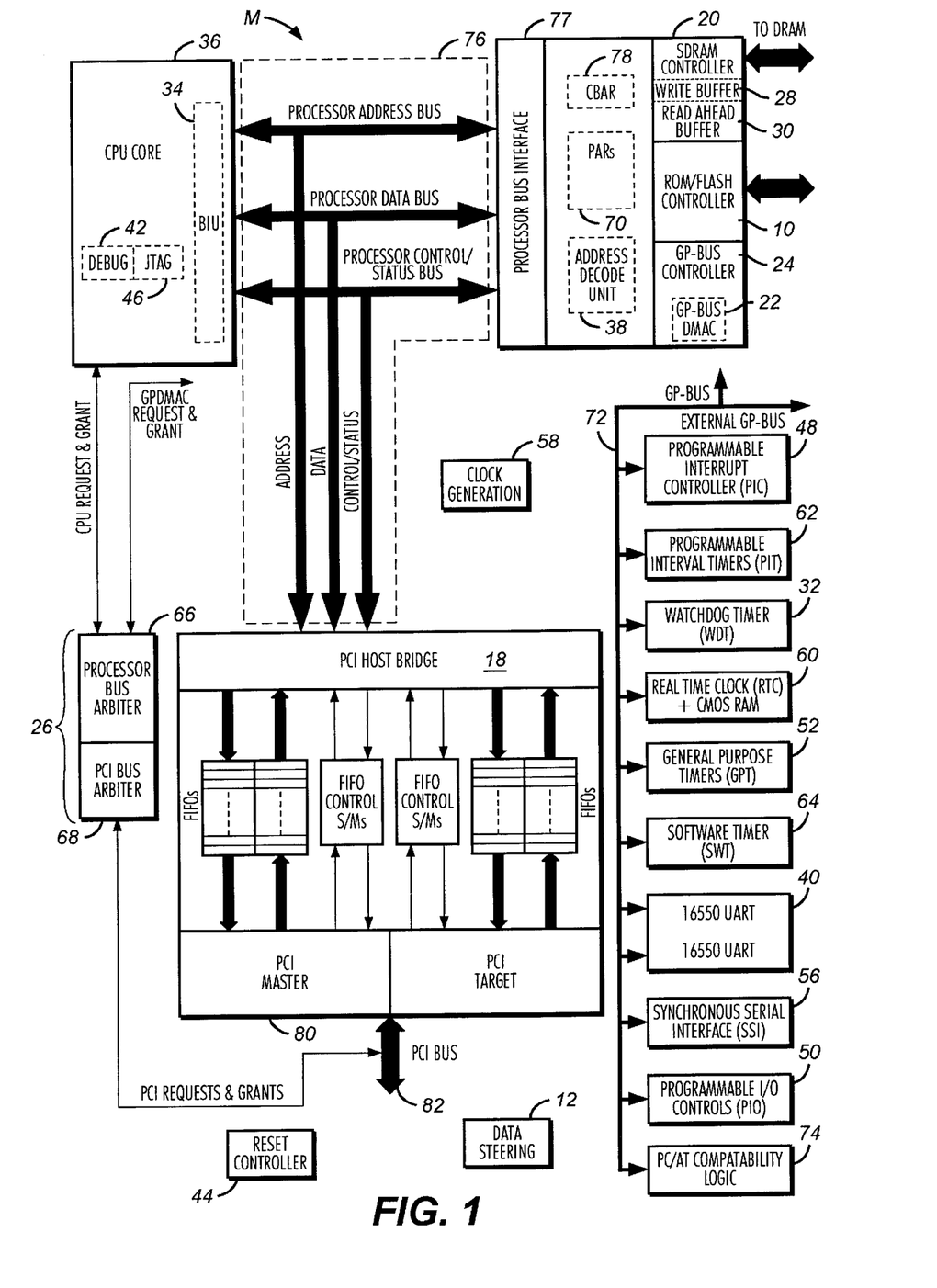
FIG. 1 is a block diagram of some elements of an exemplary microcontroller.

Turning now to the drawings, FIG. 1 shows an exemplary microcontroller M. The microcontroller M provides a highly integrated CPU 36 with a complete set of peripherals that are a superset of common PC/AT peripherals and with a set of memory mapped peripherals. In the disclosed exemplary embodiment, the CPU 36 is the Am5×86 CPU core, which utilizes the industry standard ×86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes such as cacheability, write protection for memory resources and code execution. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a synchronous dynamic random access memory (SDRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36 and PCI master controller 80 as well as external PCI bus masters connected to the PCI bus 82.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMAC 22, and the PCI host bridge 18 on behalf of an external PCI bus master. The PCI bus arbiter 68 may arbitrate between five possible PCI masters.

A processor bus interface 77 is responsible for DMA cache snooping, dynamic clock speed adjusting, dynamic bus sizing, ready signal consolidation Memory Mapped Configuration Region (MMCR) control, and general purpose address control. A bus interface unit (BIU) 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and support for up to 256 megabytes of DRAM. The DRAM controller 20 may service requests from the CPU 36, the PCI host bridge 18 on behalf of an external PCI bus master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 include support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An debug core 42 provides an integrated debug interface for embedded hardware/software debug during a special debug mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33MHz CPU clock.

The PC/AT compatibility logic 74 provides PC/AT-compatible functions. The PC/AT compatible integrated peripherals include the DMA controller 22, the PIC 48, the PIT 62, the GPT 52, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
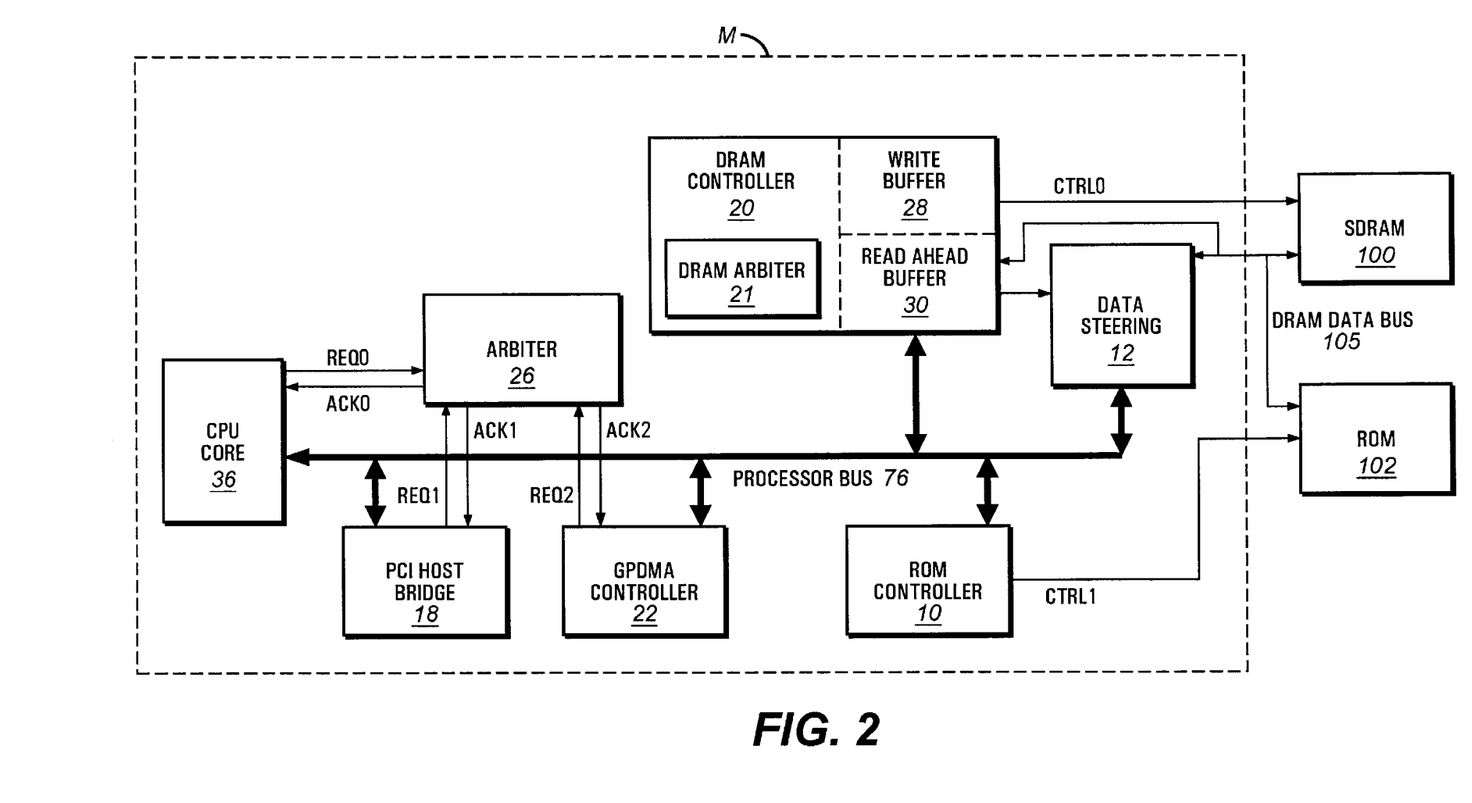
FIG. 2 is a block diagram of a portion of the microcontroller of FIG. 1.

Turning now to FIG. 2 column illustrated is a portion of the microcontroller M described above in conjunction with FIG. 1. Coupled to the processor bus 76 are three bus master devices, the CPU core 36, the PCI host bridge 18 and the GP-bus DMA controller 22. Also coupled to the processor bus 76 is the arbiter 26. In addition, each of the three processor bus master is coupled to the arbiter 26 by means of a request signal and an acknowledge signal, the CPU core 36 by a REQO signal and a ACKO signal, the PCI host bridge 18 by a REQ1 signal and a ACK1 signal and the GP-bus DMA controller 22 by a REQ2 signal and a ACK2 signal. When one of the bus master devices wants to gain control of the processor bus 76, it asserts the corresponding request line and, when the arbiter 26 grants the request, the arbiter 26 asserts the corresponding acknowledgment line. The use of the these request signals and acknowledge signals is understood by someone with skill in the art.

Also shown are two external devices: a synchronous random access memory (SDRAM) 100 and a read only memory (ROM) device 102. Both the SDRAM 100 and the ROM device 102 are connected to a DRAM data bus 105. The SDRAM 100 is controlled by the DRAM controller 20 by means of CTRL0 signals. Also shown included in the DRAM controller 20 are the write buffer 28, the read ahead buffer 30 and a DRAM arbiter 21 which arbitrates multiple access requests to the SDRAM 100. The ROM device 102 is controlled by the ROM controller 10 by means of CTRL1 signals.

Each of the processor bus masters, the CPU 36, the PCI host bridge 18 and the GP-bus DMA controller 22, can access the SDRAM controller 20, but, in the disclosed embodiment, only the CPU core 36 can access the ROM controller 10. It is noted that the DRAM data bus 105 is shared by the SDRAM 100 and the ROM device 102. This is complicated by the fact that a typical DRAM controller does not generate ROM control signals, and a typical ROM controller does not general DRAM control signals. The data steering logic 12 passes data from the SDRAM 100 directly to the SDRAM controller 20 then to the processor bus 76, but the data steering logic 12 does not pass data from the ROM device 102 to the DRAM controller 20. Data from the ROM device 102 is instead routed through the data steering logic 12 directly to the processor bus 76.

One concern when the SDRAM 100 and the ROM device 102 share the DRAM data bus 105 is caused by the write buffer at 28 and the read ahead buffer 30. The write buffer 28 may write data back to the SDRAM 100 independent of a bus master access. A collision can occur on the DRAM data bus 105 when the write buffer 28 is writing data to the SDRAM 100 at the same time the CPU core 36 is accessing the ROM device 102. A typical approach to address this concern in a device such as the microcontroller M is to provide separate data buses for the SDRAM 100 and the ROM device 102. However, the disclosed embodiment addresses this issue without the expense of a separate data bus by enabling the SDRAM 100 and the ROM device 102 to share the DRAM data bus 105.

Again, the write buffer 28 can be in the process of a write operation to the SDRAM 100 even after a bus master has completed a transaction on the processor bus 76. Also, the read ahead buffer 30 can be in the process of a SDRAM 100 prefetch operation even after the bus master has completed a transaction on the processor bus 76. These two situations create the potential for a collision between data from the ROM device 102 and data either to or from the SDRAM 100.

Figure 3:
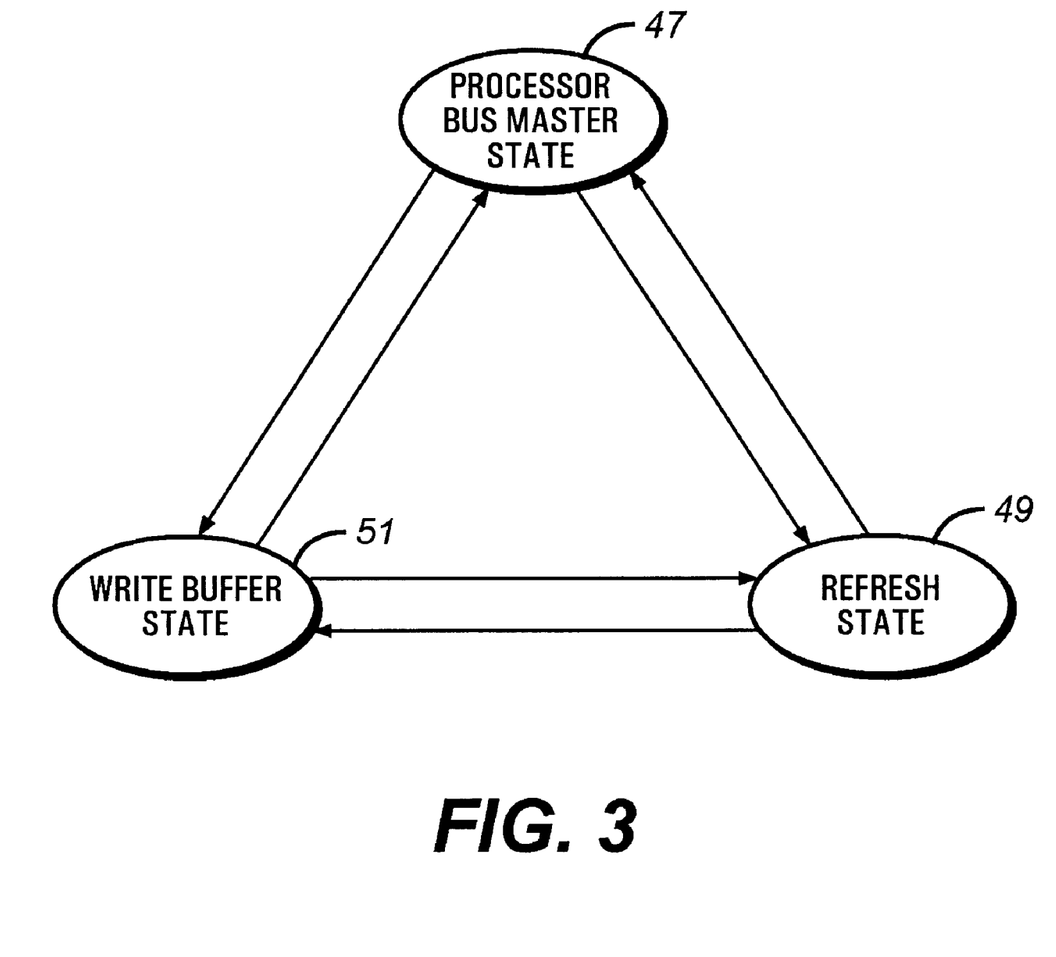
FIG. 3 is a state diagram illustrating exemplary state transitions of a DRAM arbiter of a DRAM controller.

Turning now to FIG. 3, illustrated is a state diagram of the DRAM arbiter 21 of the DRAM controller 20, both discussed above in conjunction with FIG. 2. As mentioned earlier, absent the write buffer's 28 write operation and the read ahead buffer's 30 prefetch operation, a master device on the processor bus 76 could access either the SDRAM 100 or the ROM device 102 without a data collision problem because typically only one bus master is allowed on the processor bus 76 at a time. A bus master's transaction request to the SDRAM 100 and a concurrent transaction request to the ROM device 102 are completed on the processor bus 76 before a second transaction may occur. The arbiter 26 determines which transaction should proceed. However, because the write buffer 28 and the read ahead buffer 30 can read or write to the SDRAM 100 independently of a bus master access, a collision can occur. To address this issue, the arbiter 26 employs three states: a write buffer state 51, a processor bus master state 47, and a refresh state 49.

In the disclosed embodiment, when the write buffer 28 requests permission from the DRAM controller 20 to write to the SDRAM 100 through the DRAM data bus 105, the DRAM arbiter is placed in the write buffer state 51. When the DRAM arbiter 21 is in the write buffer state and a ROM request is detected, the DRAM arbiter is transitioned to the processor bus master state 47. While in the processor bus master state 47, the arbiter 26 determines access to the DRAM data bus 105 as well as to the processor bus 76. Although a write cycle of the write buffer 28 cannot start while the DRAM arbiter 21 is in the processor bus master state 47, it is possible that a write cycle may already be in progress.

Three signals described below in conjunction with FIG. 4, a DRAM_BUSY signal, a ROM_BUSY signal and a ROM_REQ signal, are also employed to determine transitions among the write buffer state 51, the processor bus master state 47 and the refresh state 49. A prefetch operation of the read ahead buffer 30 may occur during the processor bus master state 47. In that case, the DRAM_BUSY signal is asserted by the DRAM controller 20 to inform the ROM controller 10 not to start an access of the DRAM data bus 105. The DRAM_BUSY signal is also asserted during a write operation of the write buffer 28 for the same reason.

Because the DRAM controller 20 is the primary owner of the DRAM data bus 105, the ROM controller 10 must request access to the DRAM data bus 105 by asserting the ROM_REQ signal. If the DRAM controller 20 is in the write buffer state 51 and detects the ROM_REQ signal, the DRAM arbiter transitions to the processor bus master state 47 in anticipation of a ROM cycle on the DRAM data bus 105. When the DRAM controller 20 is busy with a write operation of the write buffer 28 or a prefetch operation of the read ahead buffer 30, the DRAM controller 20 asserts the DRAM_BUSY signal. Thus when the ROM controller 10 asserts the ROM_REQ signal, it can determine whether to proceed with an access of the DRAM data bus 105 by determining whether the DRAM_BUSY signal is not asserted. A ROM cycle by the ROM controller 10 is in effect blocked when the DRAM_BUSY signal is asserted, and a DRAM cycle is in effect blocked when the ROM_BUSY signal is asserted.

When the ROM controller 10 has access to the DRAM data bus 105, the DRAM arbiter 21 transitions to the refresh state 49. In the refresh state 49, SDRAM refresh cycles of the SDRAM controller 20 are allowed to occur because the DRAM data bus 105 is not employed for SDRAM refresh cycles. When the ROM controller is finished using the DRAM data bus 105, the ROM_REQ signal is deasserted and then the DRAM arbiter 21 transitions to the master state. If the ROM_REQ signal is deasserted and the write buffer 28 is providing a priority flush request, the DRAM arbiter 21 transitions from the refresh state to the write buffer state 51 to maintain data coherency. A read prefetch does not need to request access from the DRAM arbiter 21. In a disclosed embodiment, a read prefetch occurs after a master access if prefetch is enabled and the master read request is greater than one DWORD. A read prefetch continues to access SDRAM after the master read has completed its access.

Figure 4:
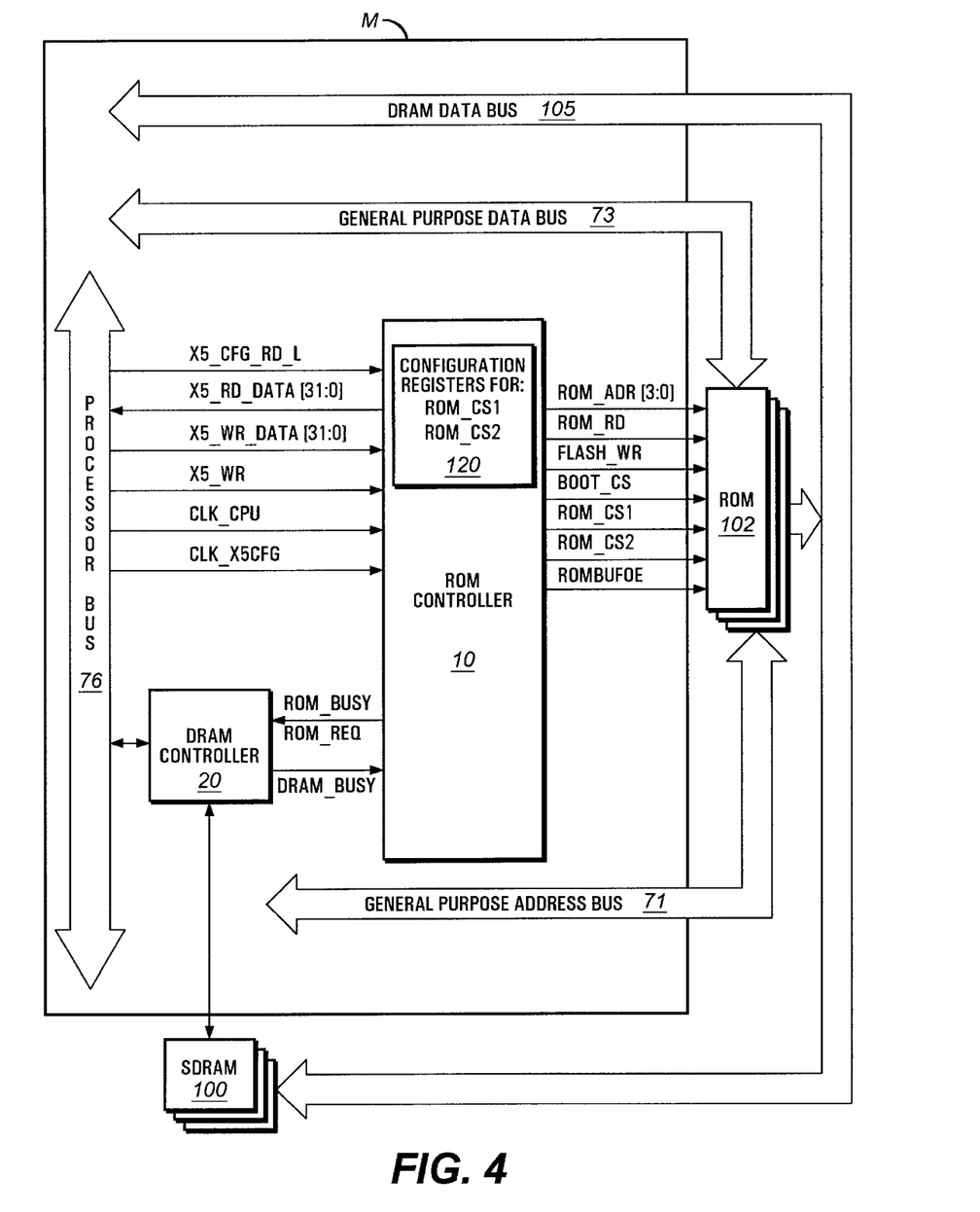
FIG. 4 illustrates a DRAM data bus, a general purpose data bus, a general purpose address bus, a processor bus and a ROM controller coupled to both ROM devices and the DRAM controller of FIG. 1.

Turning now to FIG. 4, illustrated is a block diagram depicting one embodiment of the relationship between the DRAM controller 20 and the ROM controller 10, both illustrated in FIGS. 1 and 2. For purposes of clarity, the figure depicts only circuitry relevant to understanding how the ROM controller 10 couples to processor bus 76, the DRAM controller 20 and the ROM 102.

In the disclosed embodiment, the microcontroller M supports up to three external ROM devices 102. All three of the ROMs 102 are addressed from the general purpose address bus 71, shown in gray shading. However, one of two different data buses, a general purpose data bus 73, or a DRAM data bus 105 may be selected for sending data to or receiving data from any of the three ROM devices 102. Further, each ROM 102 may select a different data bus for data transmittal.

Included in the ROM controller 10 are configuration registers 120 for the ROM_CS1 and ROM_CS2 signals. For the non-boot ROMs, that is, those driven by either the ROM_CS1 or ROM_CS2 signals, the configuration registers 120 are used to select which data bus, the DRAM data bus 105 or the general purpose data bus 73, is to be used for data transmission between either of the ROMs 102 and the processor 36 of the microcontroller M. However, for the boot ROM, that is, the ROM driven by a BOOT_CS signal, the data bus selection is determined using pin strapping.

For the microcontroller M of the illustrative system, ROM devices are addressed via the general purpose bus, independent of whether the data pins of the ROM 102 are connected to the general purpose data bus 73 or the DRAM data bus 105. In the disclosed embodiment, ROM devices 102 are accessible by the processor 36 only. If either the general purpose bus DMA controller 22 or the PCI host bridge 18 attempts a read from or a write to the ROM 102, the transfer will force a DRAM cycle and the data will be discarded.

Figure 5:
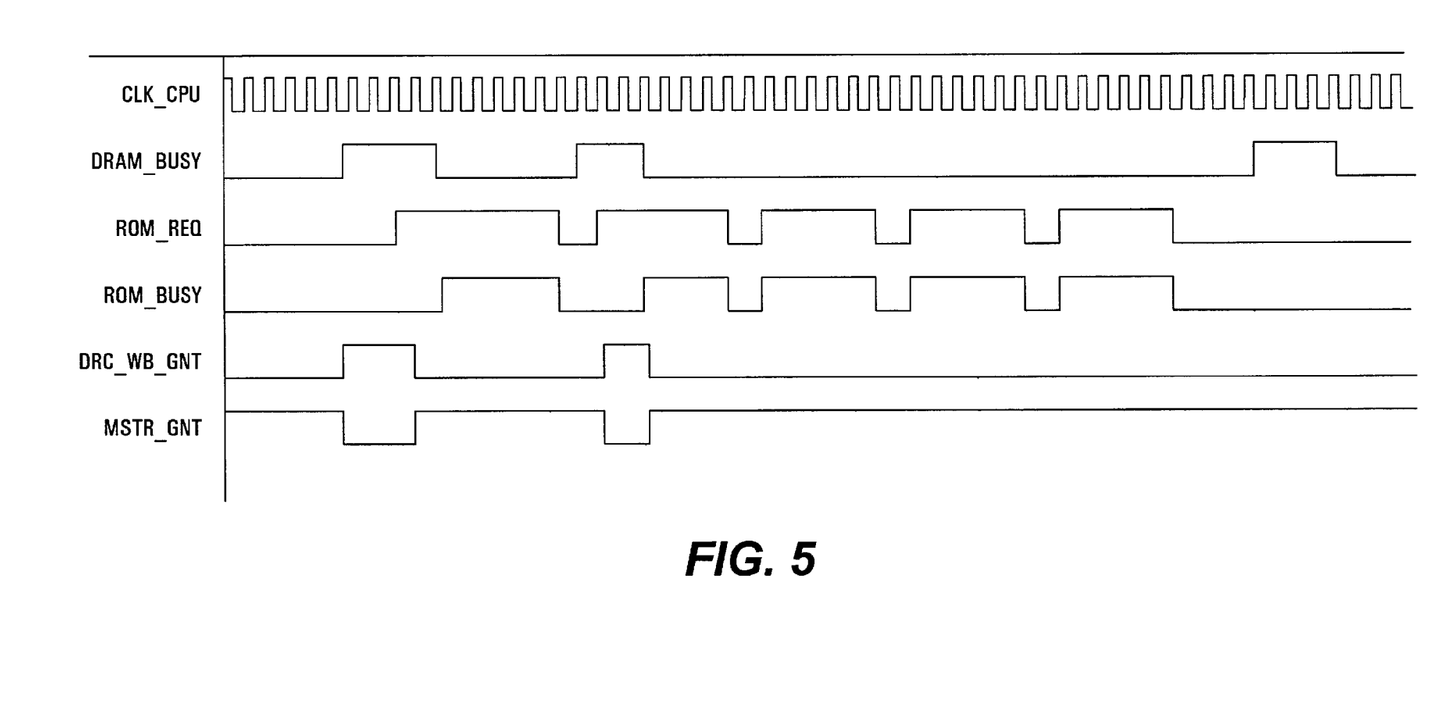
FIG. 5 is a timing diagram illustrating exemplary memory device access of a DRAM bus by a DRAM device and a ROM device.

Turning now to FIG. 5, illustrated is a timing diagram of the signals between the ROM controller 10 and the DRAM controller 20 described above in conjunction with FIGS. 3 and 4. A CLK_MEM signal (not shown) at twice the CPU clock signal CLK_CPU drives the SDRAM controller 20. However, all bus masters (the CPU 36, the PCI host bridge 18, and the GP DMAC 22) use the CLK_CPU signal. Synchronization of the CLK_CPU and CLK_MEM signals is described in more detail in the commonly assigned patent application entitled "SDRAM/CPU CLOCK SYNCHRONIZATION SCHEME" previously incorporated herein by reference. FIG. 5 shows the DRAM data bus 105 first being accessed by the write buffer 28, then by the ROM controller 102, the write buffer 28 again, then by the ROM controller 20 four times in succession, and finally the DRAM controller 20.

The MSTR_GNT signal reflects the processor bus master state 47 of FIG. 3. The DRC_WB_GNT signal reflects the write buffer state 51 of FIG. 3. When the DRC_WB_GNT signal is asserted, the write buffer 28 is busy or the DRAM arbiter 21 is parked in the write buffer state 51. Therefore the DRAM_BUSY signal is asserted to tell the ROM controller 10 not to use the DRAM data bus 105 even if the write buffer 28 is not actually busy. If the write buffer 28 is not active, but the DRAM arbiter 21 is parked in the write buffer state 51, asserting ROM_REQ will allow the ROM controller 10 access to the DRAM data bus 105 immediately. When the DRAM controller 20's DRAM arbiter 21 goes to the processor bus master state 47 because the ROM_REQ signal has been asserted, ROM_BUSY is asserted to tell the DRAM controller 21 that the ROM controller 102 has control of the DRAM data bus 105. When the DRAM_BUSY signal is deasserted, ROM accesses of the DRAM data bus 105 may occur.

When the write buffer 28 needs the DRAM bus 105, it waits until ROM_BUSY is deasserted and then "grabs" the DRAM bus 105 to execute an SDRAM write cycle. DRAM_BUSY is asserted and the ROM controller 102 waits to access the DRAM data bus 105, asserting ROM_REQ to indicate the request for the DRAM data bus 105. The DRAM arbiter 21 samples ROM_REQ asserted and asserts MSTR_GNT to indicate that the ROM controller 102 owns the DRAM data bus 105. When the DRAM_BUSY is sampled deasserted, the DRAM controller 20 does not own the DRAM data bus 105, therefore the ROM controller 102 may access the bus by asserting ROM_REQ and ROM_BUSY.

Figure 6A:
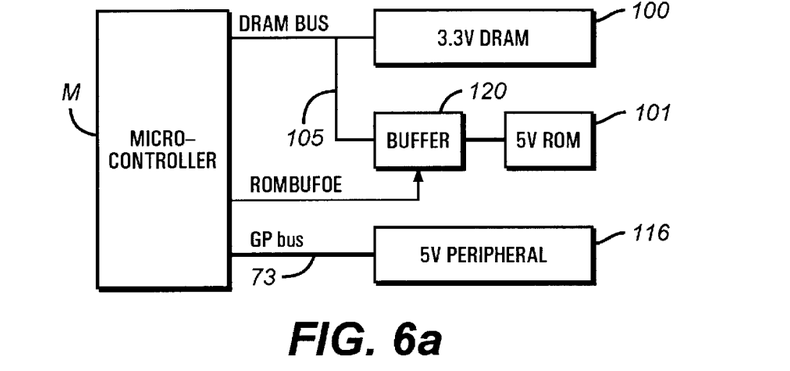
FIGS. 6a, 6b and 6c are block diagrams showing several exemplary, buffered DRAM/ROM configurations.
Figure 6B:
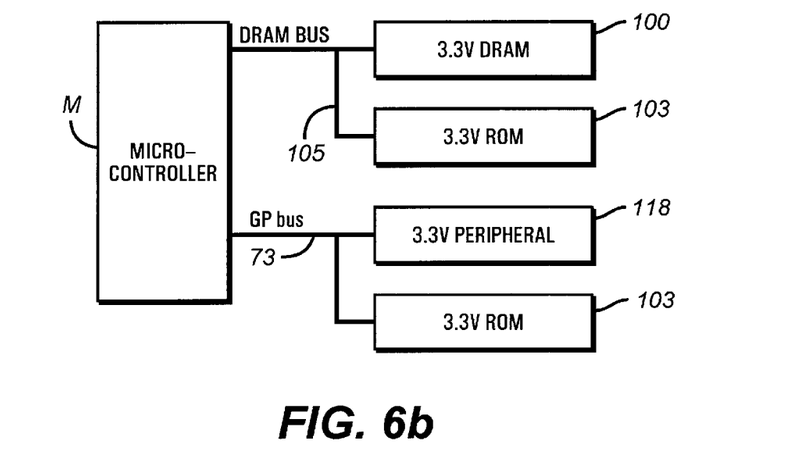
Figure 6C:
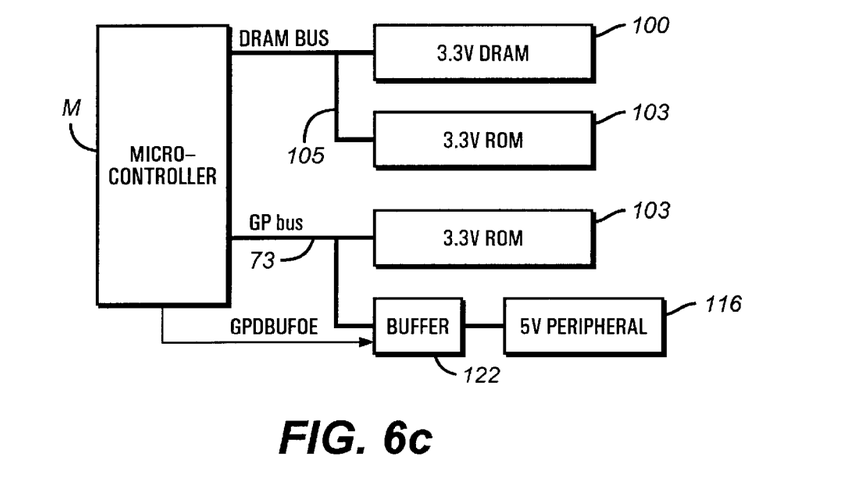

Turning now to FIGS. 6a, 6b and 6c, illustrated are block diagrams showing several exemplary buffered DRAM/ROM configurations. Because the DRAM data bus 105 may potentially service both a DRAM 100 and the ROM 102, the voltage requirements of each device merit consideration.

In the disclosed embodiment, both the DRAM data bus 105 and the general purpose bus 72 are 5V tolerant and drive 3.3V. However, not all devices are 5V tolerant. For example, 3.3V DRAM is known to be available on the market. So, if a 3.3V DRAM device is not 5V tolerant and shares the DRAM data bus 105 with 5V ROM devices, the 3.3V DRAM device could be damaged during ROM read accesses.

The incompatibility between device voltage tolerances is addressed using an isolation buffer. The isolation buffer is employed when using a 5V ROM device and a 3.3V DRAM device that is not 5V tolerant on the same bus. Use of an isolation buffer is described in more detail in the commonly assigned patent application, entitled "FLEXIBLE MICROCONTROLLER ARCHITECTURE," previously incorporated herein by reference.

In FIG. 6a, a 3.3V DRAM 100 that is not 5V tolerant and a 5V ROM 101 are configured to use the DRAM data bus 105. An isolation buffer 120 allows the two devices to share the bus without damage to the 3.3V DRAM 100. In the disclosed embodiment, a ROMBUFOE signal is driven from the ROM controller 10 to the isolation buffer 120 to allow access by the 5V ROM to the DRAM data bus 105.

Turning to FIG. 6b, an isolation buffer 120 is not used when a 3.3V DRAM 100 and a 3.3V ROM 103 share the DRAM data bus 105. Likewise, the isolation buffer 120 is not used when a 3.3V peripheral 118 shares the GP bus 72 with a 3.3V ROM 103.

Turning now to FIG. 6c, an isolation buffer 122 is used when a 3.3V ROM 103 that is not 5V tolerant and a 5V peripheral device 116 share the GP bus 72. In the disclosed embodiment, the GP bus controller 22 drives the GPDBUFOE signal to the isolation buffer 122 to allow access by the 5V peripheral 122 to the GP bus 72.

The foregoing disclosure and description of the various embodiments are illustrative and explanatory thereof, and various changes in the descriptions and attributes of the microcontroller, signaling, registers, DRAM controller, ROM controller and other circuitry, the organization of the components, and the order and timing of steps taken, as well as in the details of the illustrated system may be made without departing from the spirit of the invention. While an exemplary system is described in the context of a microcontroller, it shall be understood that a system according to the described techniques can be implemented in a variety of other processor-based systems.

I claim:

1. A processor-based device that supports both volatile memory devices and non-volatile memory devices on a shared data bus, the processor-based device comprising:
   a data bus;
   a processor coupled to the data bus;
   a non-volatile memory controller coupled to the data bus for controlling the non-volatile memory devices;
   a volatile memory controller coupled to the data bus for controlling the volatile memory devices;
   a non-volatile memory busy signal coupled between the non-volatile memory controller and the volatile memory controller to indicate the non-volatile memory controller is busy with the data bus;
   a non-volatile memory request signal coupled between the non-volatile memory controller and the volatile memory controller to indicate the non-volatile memory controller is requesting access to the data bus; and
   a volatile memory busy signal coupled between the volatile memory controller and the non-volatile memory controller to indicate the volatile memory controller is busy with the data bus.

2. The processor-based device of claim 1, wherein the data bus is a dynamic random access memory (DRAM) data bus.

3. The processor-based device of claim 1, the volatile memory controller comprising:
   a volatile memory arbiter to initiate a refresh cycle to the volatile memory device while the non-volatile memory controller owns the data bus.

4. The processor-based device of claim 1, wherein a non-volatile memory cycle by the non-volatile memory controller is blocked if the volatile memory busy signal indicates the volatile memory controller is busy with the data bus.

5. The processor-based device of claim 1, wherein a volatile memory cycle by the volatile memory controller is blocked if the non-volatile memory busy signal indicates the non-volatile memory controller is busy with the data bus.

6. The processor-based device of claim 1, the volatile memory controller comprising:
   a volatile memory arbiter with a write buffer state and a processor bus master state,
   wherein a write buffer of the volatile memory controller is operable to initiate a write buffer cycle using the data bus, the volatile memory arbiter transitions from the write buffer state to the processor bus master state if the non-volatile memory request signal is asserted when the volatile memory arbiter is in the write buffer state, and the write buffer is not operable to initiate a write buffer cycle in the processor bus master state.

7. The processor-based device of claim 1, the volatile-memory controller including a write buffer, wherein the volatile memory busy signal informs the non-volatile memory controller the data bus is busy with a write buffer cycle of the write buffer.

8. The processor-based device of claim 1, the volatile-memory controller including a read ahead buffer, wherein the volatile memory busy signal informs the non-volatile memory controller the data bus is busy with a read prefetch cycle of the read ahead buffer.

9. The processor-based device of claim 1, further comprising:
   an isolation buffer coupled between the data bus and the non-volatile memory device; and
   a buffer enable signal driven by the non-volatile memory controller to activate the isolation buffer when the non-volatile memory device is being accessed.

10. The processor-based device of claim 1, wherein the non-volatile memory controller comprises a configuration pin to indicate the non-volatile memory is coupled to the data bus.

11. The processor-based device of claim 1, wherein the non-volatile memory device is a read-only memory (ROM)

device and the volatile memory device is a dynamic random access memory (DRAM) device.

12. A method of sharing a data bus by a volatile memory coupled to a volatile memory controller, and a non-volatile memory coupled to a non-volatile memory controller, comprising the steps of:

asserting a non-volatile memory busy signal to indicate the non-volatile memory controller is busy with the data bus;

deasserting the non-volatile memory busy signal to indicate the non-volatile memory controller is finished with the data bus;

asserting a volatile memory busy signal to indicate the volatile memory controller is busy with the data bus;

deasserting the volatile memory busy signal to indicate the volatile memory controller is finished with the data bus; and asserting a non-volatile memory request signal to indicate the non-volatile memory controller needs access to the data bus.

13. A method as in claim 12, further comprising the step of:

initiating a refresh cycle to the volatile memory responsive to the non-volatile memory busy signal.

14. A method as in claim 12, further comprising the step of:

blocking a non-volatile memory cycle by the non-volatile memory controller responsive to the volatile memory busy signal.

15. A method as in claim 12, further comprising the step of:

blocking a volatile memory cycle by the volatile memory controller responsive to the non-volatile memory busy signal.

16. A method as in claim 12, wherein the volatile memory controller comprises a volatile memory arbiter with a write buffer state and a processor bus master state, further comprising the steps of:

transitioning the volatile memory arbiter from the write buffer state to the processor bus master state responsive to the non-volatile memory request signal when the volatile memory arbiter is in the write buffer state, and preventing the write buffer of the volatile memory controller from initiating access to the data bus when the volatile memory arbiter is in the processor bus master state.

17. A method as in claim 12, further comprising the step of:

asserting the volatile memory busy signal when the data bus is busy with a write buffer cycle of the write buffer of the volatile memory controller.

18. A method as in claim 12, further comprising the step of:

asserting the volatile memory busy signal responsive to a read prefetch cycle of the read ahead buffer of the volatile memory controller.

19. A volatile memory arbiter adapted to control a write buffer of a volatile memory controller sharing a data bus with a non-volatile memory controller, comprising:

a write buffer state logic to provide a write state; and a processor bus master state logic to provide a processor bus master state, wherein the write buffer is operable to initiate a write buffer cycle using the data bus when the volatile memory arbiter is in the write buffer state and the write buffer is not operable to initiate a write buffer cycle when the volatile memory arbiter is in the processor bus master state.

20. A volatile memory arbiter as in claim 19, further comprising:

refresh state logic to provide a refresh state, wherein the volatile memory arbiter transitions to the refresh state responsive to an indication that the non-volatile memory controller owns the data bus, and wherein the volatile memory arbiter initiates a refresh cycle to the volatile memory when the volatile memory arbiter transitions to the refresh state.

* * * * *